United States Patent
Chahwan et al.

(10) Patent No.: US 10,748,568 B1
(45) Date of Patent: Aug. 18, 2020

(54) DATA STORAGE DEVICE EMPLOYING DYNAMIC TRACK TRAJECTORIES

(71) Applicant: Western Digital Technologies, Inc., San Jose, CA (US)

(72) Inventors: Alain Chahwan, Irvine, CA (US); Niranjay Ravindran, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/532,717

(22) Filed: Aug. 6, 2019

(51) Int. Cl.
| | | |
|---|---|---|
| *G11B 5/56* | (2006.01) | |
| *G11B 5/55* | (2006.01) | |
| *G11B 21/12* | (2006.01) | |
| *G11B 20/10* | (2006.01) | |
| *G11B 5/58* | (2006.01) | |

(52) U.S. Cl.
CPC ...... *G11B 5/5543* (2013.01); *G11B 20/10388* (2013.01); *G11B 21/12* (2013.01); *G11B 5/5547* (2013.01); *G11B 5/56* (2013.01); *G11B 5/58* (2013.01)

(58) Field of Classification Search
None
See application file for complete search history.

(56) References Cited

U.S. PATENT DOCUMENTS

| | | | | |
|---|---|---|---|---|
| 4,532,562 | A * | 7/1985 | Powell | G11B 5/5547 |
| | | | | 318/561 |
| 5,859,742 | A * | 1/1999 | Takaishi | G11B 5/5534 |
| | | | | 360/77.07 |
| 6,369,974 | B1 * | 4/2002 | Asgari | G11B 5/59655 |
| | | | | 360/75 |
| 6,657,810 | B1 | 12/2003 | Kupferman | |
| 6,707,635 | B1 | 3/2004 | Codilian et al. | |
| 6,735,033 | B1 | 5/2004 | Codilian et al. | |
| 6,950,967 | B1 | 9/2005 | Brunnett et al. | |
| 7,123,433 | B1 * | 10/2006 | Melrose | G11B 5/59627 |
| | | | | 360/77.04 |
| 7,457,075 | B2 | 11/2008 | Liu et al. | |
| 7,626,782 | B1 | 12/2009 | Yu et al. | |
| 7,653,847 | B1 | 1/2010 | Liikanen et al. | |
| 7,929,234 | B1 | 4/2011 | Boyle et al. | |
| 7,961,422 | B1 | 6/2011 | Chen et al. | |
| 8,619,381 | B2 | 12/2013 | Moser et al. | |
| 8,625,224 | B1 | 1/2014 | Lin et al. | |
| 8,693,134 | B1 | 4/2014 | Xi et al. | |
| 8,699,172 | B1 | 4/2014 | Gunderson et al. | |
| 8,736,995 | B1 * | 5/2014 | Wiesen | G11B 5/59694 |
| | | | | 360/27 |
| 8,854,751 | B2 | 10/2014 | Rub | |
| 8,867,153 | B1 | 10/2014 | Coker et al. | |
| 8,988,810 | B1 | 3/2015 | Liew et al. | |
| 9,026,728 | B1 | 5/2015 | Xi et al. | |
| 9,087,540 | B1 * | 7/2015 | Lee | G11B 5/59627 |

(Continued)

*Primary Examiner* — Tan X Dinh

(57) ABSTRACT

A data storage device is disclosed comprising a head actuated over a disk comprising servo data for defining a plurality of data tracks, including consecutive data tracks N−1, N, and N+1. Data is written to data track N using a position error signal (PES) generated by reading the servo data, and a read track trajectory for data track N is generated based on the PES of the write. Data is read from data track N based on the read track trajectory for data track N.

20 Claims, 10 Drawing Sheets

(56) References Cited

U.S. PATENT DOCUMENTS

| | | |
|---|---|---|
| 9,230,605 B1 | 1/2016 | Moser et al. |
| 9,236,073 B1 * | 1/2016 | Liu ................. G11B 5/012 |
| 9,336,073 B1 * | 5/2016 | Wiesen ............. G11B 5/59694 |
| 9,355,667 B1 | 5/2016 | Santee et al. |
| 9,378,763 B1 | 6/2016 | Kim et al. |
| 9,412,403 B1 | 8/2016 | Dhanda et al. |
| 9,495,988 B1 * | 11/2016 | Liu ................. G11B 20/10009 |
| 9,934,871 B2 | 4/2018 | Squires |
| 10,056,109 B2 | 8/2018 | Liu et al. |
| 10,192,570 B2 | 1/2019 | Kawabe et al. |
| 2005/0128634 A1 * | 6/2005 | Schmidt ............ G11B 5/59627 360/77.04 |
| 2005/0237660 A1 * | 10/2005 | Schmidt ............ G11B 5/59627 360/77.02 |
| 2011/0188149 A1 * | 8/2011 | Albrecht ............ G11B 5/596 360/71 |
| 2012/0162806 A1 | 6/2012 | Champion et al. |
| 2012/0307400 A1 | 12/2012 | Kawabe |
| 2014/0055883 A1 * | 2/2014 | Dhanda ............ G11B 5/09 360/77.08 |

* cited by examiner

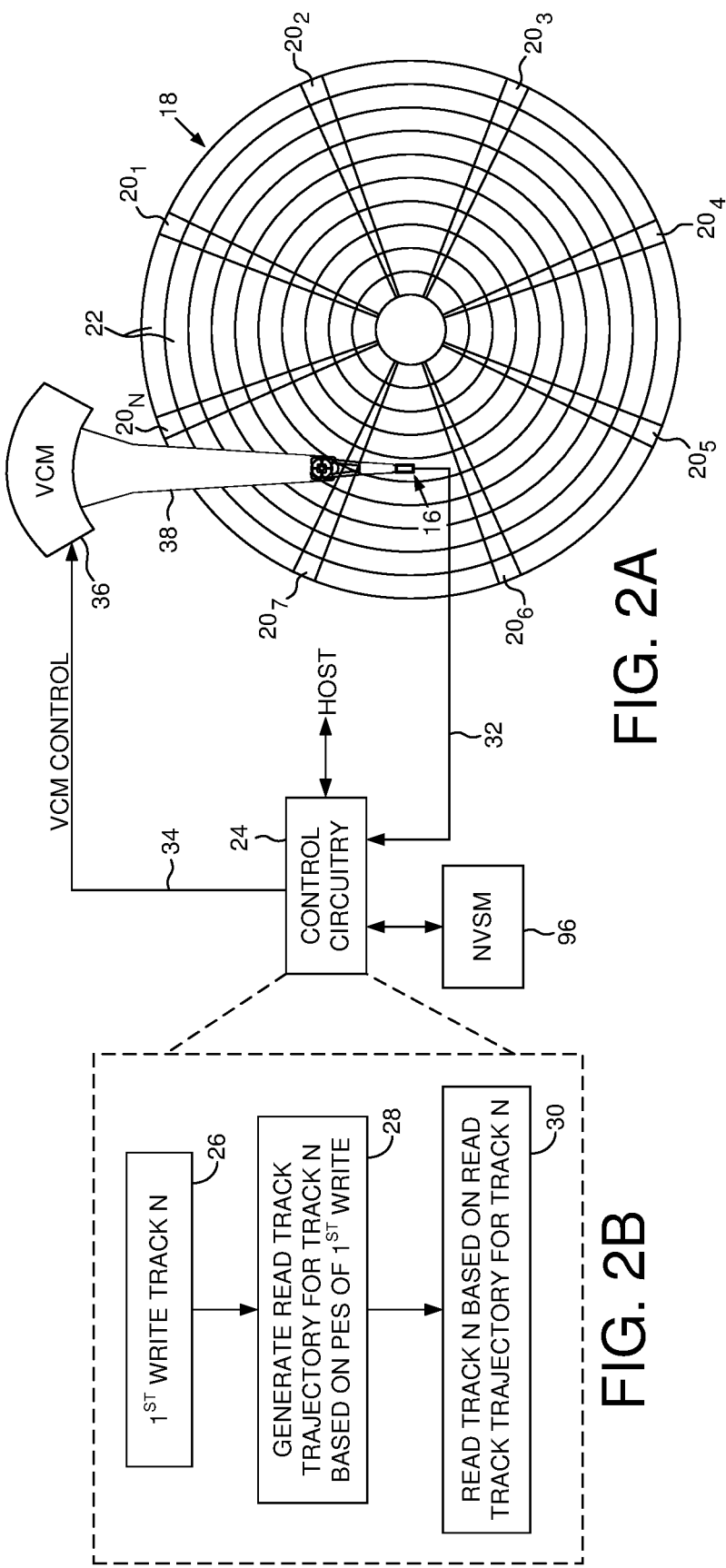
FIG. 2A
FIG. 2B
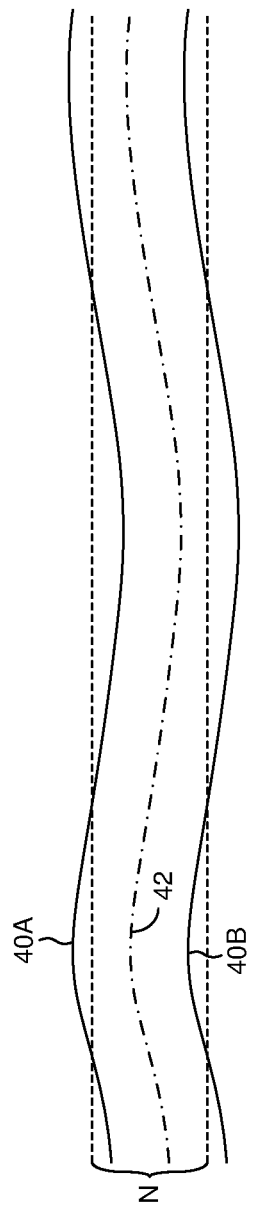
FIG. 2C

DATA STORAGE DEVICE EMPLOYING DYNAMIC TRACK TRAJECTORIES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk.

FIG. 2B is a flow diagram according to an embodiment wherein when writing to data track N a read track trajectory is generated for data track N based on the PES of the write operation.

FIG. 2C shows an example of a write to data track N including the data track centerline deviating from an ideal centerline.

DETAILED DESCRIPTION

Figure 1:
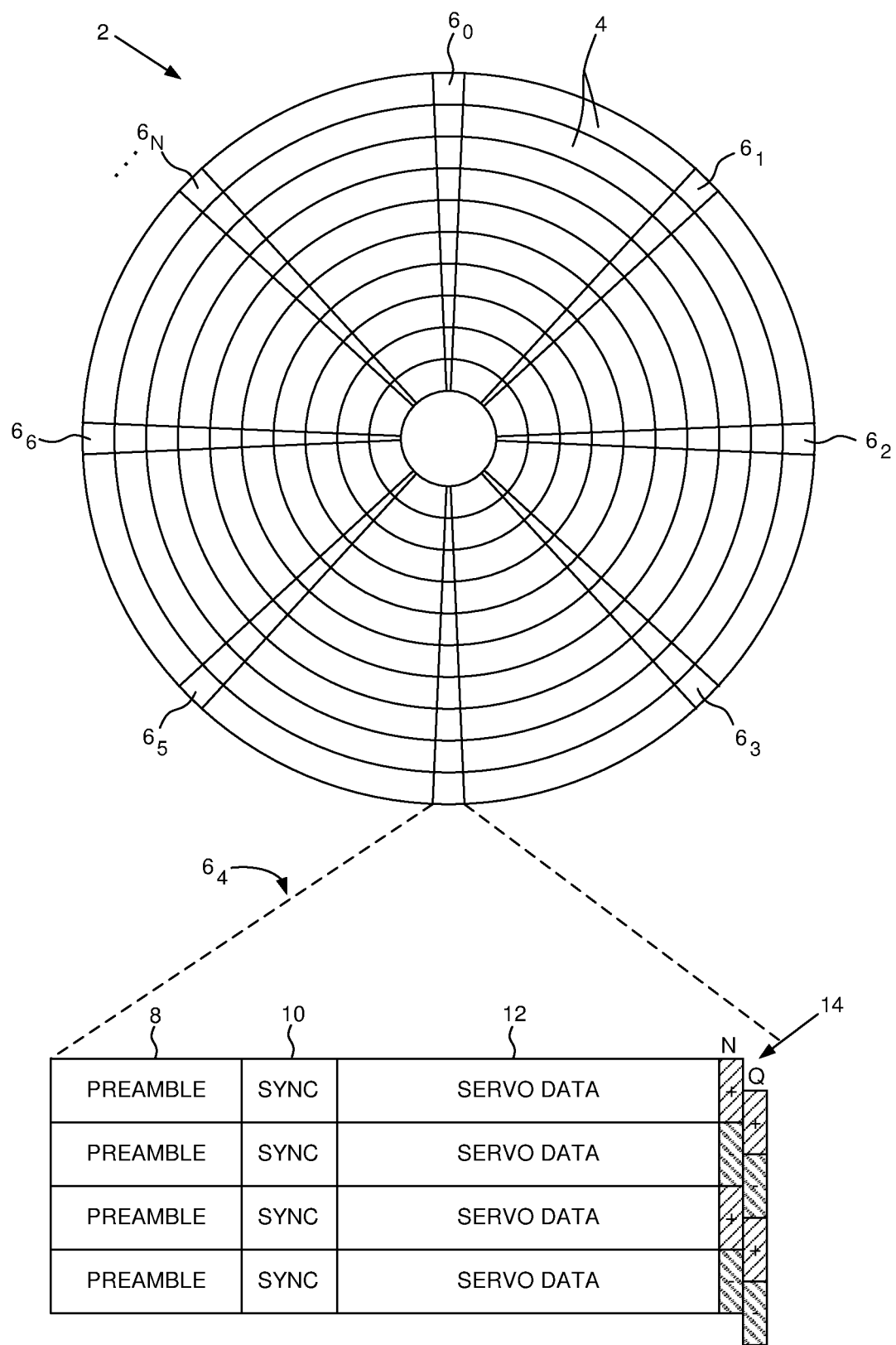
FIG. 1 shows a prior art disk format comprising a plurality of servo tracks defined by servo sectors.

FIG. 2A shows a data storage device in the form of a disk drive comprising a head 16 actuated over a disk 18 comprising servo data (e.g., servo sectors $20_1$-$20_N$) for defining a plurality of data tracks 22, including consecutive data tracks N−1, N, and N+1. The disk drive further comprises control circuitry 24 configured to execute the flow diagram of FIG. 2B, wherein data track N is first written to using a first PES generated by reading the servo data (block 26) such as shown in FIG. 2C. A read track trajectory for data track N is generated based on the first PES of the first write (bock 28), and data track N is read from based on the read track trajectory for data track N (block 30).

In the embodiment of FIG. 2A, the disk 18 comprises a plurality of servo sectors $20_1$-$20_N$ that define a plurality of servo tracks, wherein the data tracks 22 are defined relative to the servo tracks at the same or different radial density. The control circuitry 24 processes a read signal 32 emanating from the head 16 to demodulate the servo sectors and generate a position error signal (PES) representing an error between the actual position of the head and a target position relative to a target track. A servo control system in the control circuitry 24 filters the PES using a suitable compensation filter to generate a control signal 34 applied to a VCM 36 which rotates an actuator arm 38 about a pivot in order to actuate the head radially over the disk surface in a direction that reduces the PES. In one embodiment, the head 16 may be actuated over the disk 18 based on the PES using one or more secondary actuators, for example, a microactuator that actuates a suspension coupling a head slider to the actuator arm 38, or a microactuator that actuates the head slider relative to the suspension (e.g., using a thermal actuator, piezoelectric actuator, etc.). The servo sectors $20_1$-$20_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

When writing to data track N such as shown in FIG. 2C, the head deviates from an ideal centerline due, for example, to a vibration affecting the disk drive, a defect on the disk where a servo sector is recorded, a written-in repeatable runout (WRRO) error of a servo sector, etc. In the example of FIG. 2C, the deviations from the ideal centerline is represented by the circuitous edges 40A and 40B of the written data track when writing to data track N. In one embodiment, the PES generated when reading each servo sector while writing track data N is used to generate a read track trajectory 42 for data track N. Accordingly when reading data track N, the read track trajectory is used as the reference position for the servo control system instead of the ideal track centerline, thereby improving the ability to successfully recover the recorded data. In one embodiment, the read track trajectory 42 for data track N is generated by adding to the ideal track centerline for data track N half the PES value generated at each servo sector when writing to data track N.

Figure 3A:
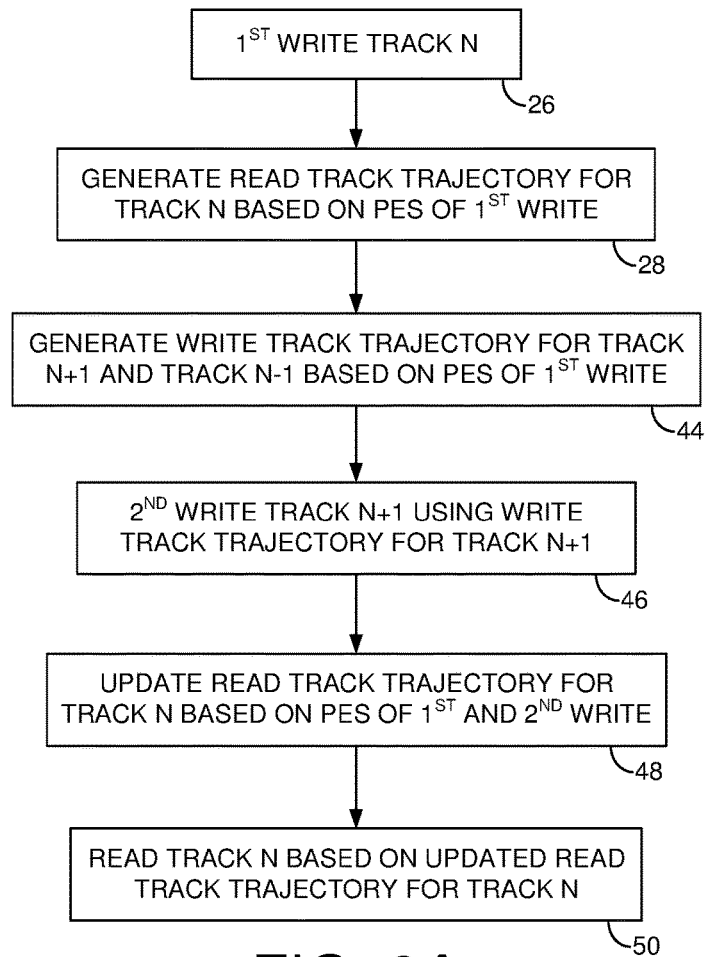
FIG. 3A is a flow diagram according to an embodiment wherein when writing to data track N+1, the read track trajectory for data track N is updated based on the PES of the write to data track N and the PES of the write to data track N+1.
Figure 3B:
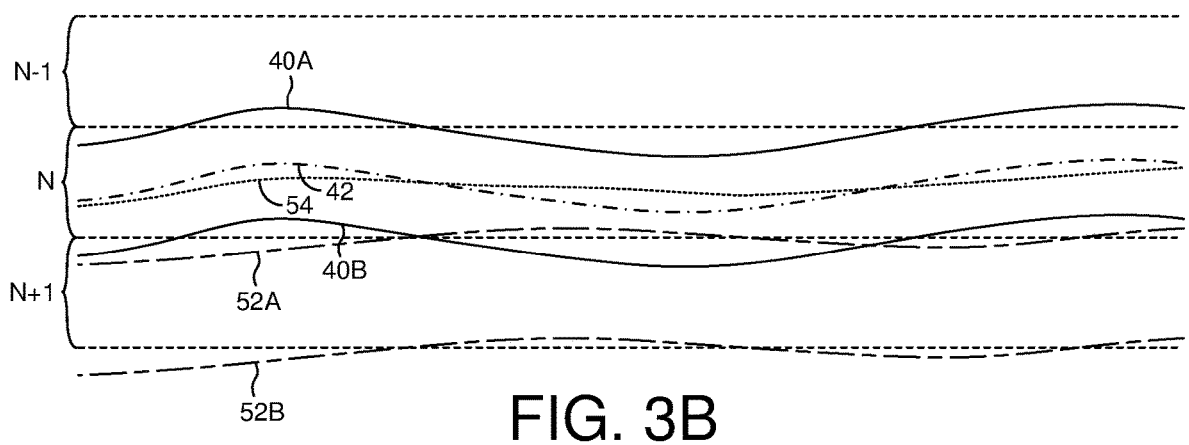
FIG. 3B shows an example of a write to data track N and then to data track N+1 wherein the read track trajectory for data track N is updated to compensate for the adjacent track interference from data track N+1.

FIG. 3A is a flow diagram according to an embodiment which extends on the flow diagram of FIG. 2B, wherein when writing to data track N a write track trajectory is generated for data track N+1 and N-1 based on the PES of the write to data track N (block 44). In one embodiment, the write track trajectory for data track N+1 and data track N-1 is generated based on half the value of the PES generated at each servo sector when writing to data track N. That is, the data track centerline for data track N+1 and N-1 are offset based on half the value of the PES in order to compensate for the adjacent track interference from writing to data track N. At block 46, data is written to data track N+1 (such as shown in FIG. 3B) using the write track trajectory for data track N+1 generated at block 44. The read track trajectory for data track N is updated at block 48 based on the PES of writing to track N and the PES of writing to track N+1. In one embodiment, the read track trajectory for data track N may be updated based on the average of the PES of writing to data track N and the PES of writing to data track N+1. At block 50, data is read from data track N using the updated read track trajectory for track N.

FIG. 3B shows an example of writing to data track N and then to data track N+1, including the circuitous edges 52A and 52B of the written data track when writing to data track N+1 and the resulting adjacent track interference imposed on data track N. In order to compensate for this adjacent track interference, the read track trajectory for data track N is updated from trajectory 42 to trajectory 54 based on the PES of writing to data track N and the PES of writing to data track N+1. In one embodiment, the read trajectory for data track N is updated by adding to the ideal track centerline the average of the PES of writing to data track N and the PES of writing to data track N+1. In this embodiment, the updated read track trajectory 54 for data track N follows a trajectory that is substantially centered between edge 40A of written data track N and edge 52A of written data track N+1 as shown in FIG. 3B. In this manner, the signal-to-noise ratio (SNR) is increased when reading data track N along read track trajectory 54.

Figure 4A:
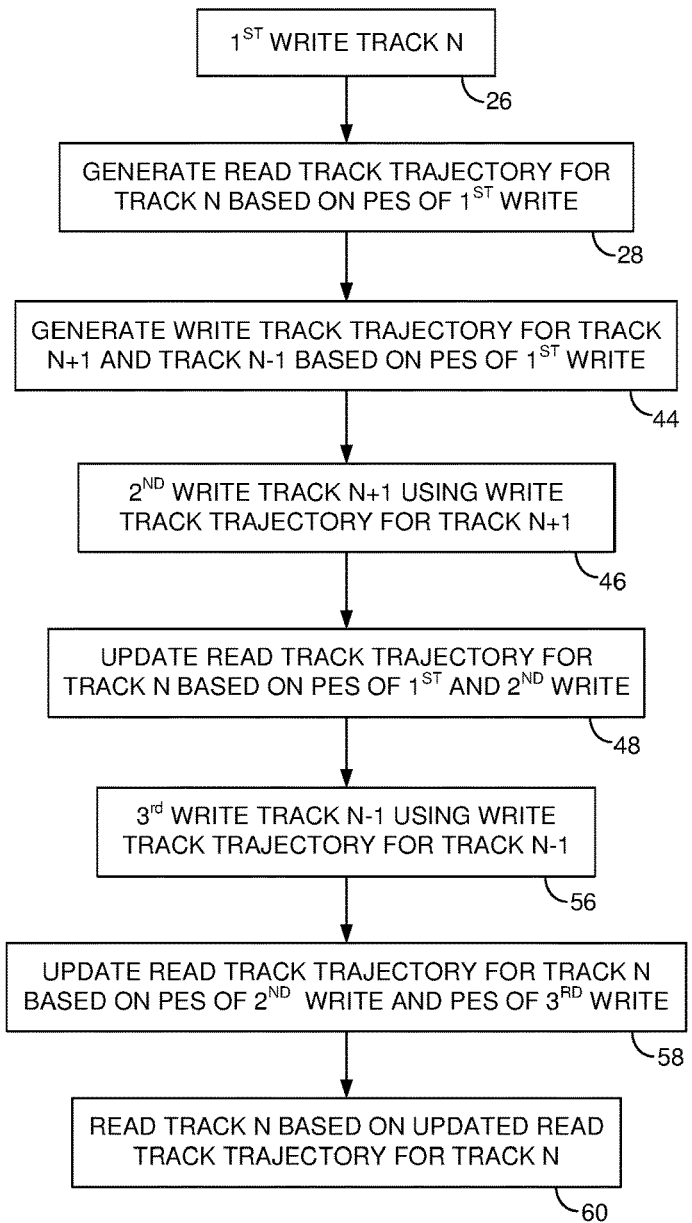
FIG. 4A is a flow diagram according to an embodiment wherein when writing to data track N−1, the read track trajectory for data track N is updated based on the PES of the write to data track N−1 and the PES of the write to data track N+1.
Figure 4B:
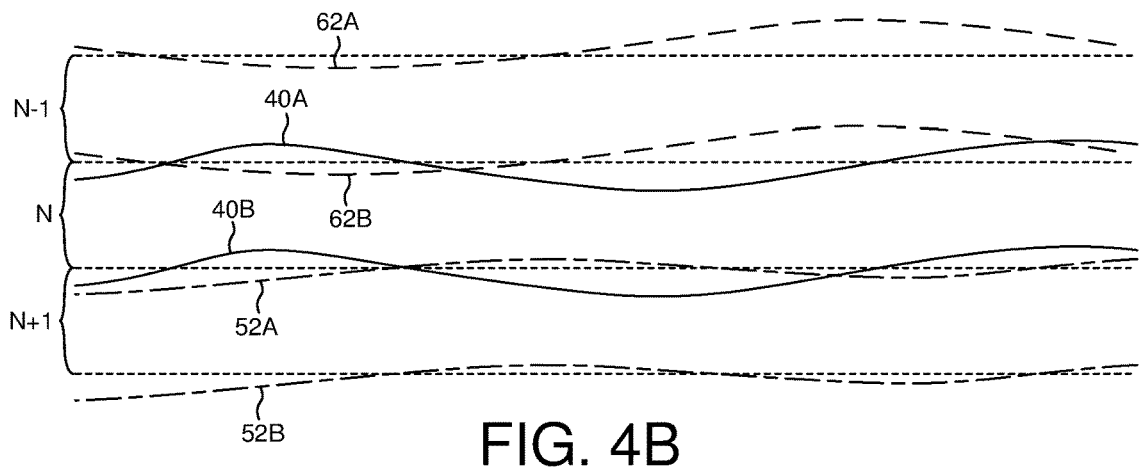
FIG. 4B shows an example of a write to data track N, then to data track N+1, then to data track N−1, wherein the read track trajectory for data track N is updated to compensate for the adjacent track interference from writing to data track N+1 and N−1.

FIG. 4A is a flow diagram according to an embodiment which extends on the flow diagram of FIG. 3A, wherein at block 56 data is written to data track N-1 (such as shown in FIG. 4B) using the write track trajectory for data track N-1 generated at block 44. The read track trajectory for data track N is updated at block 58 based on the PES of writing to track N+1 and the PES of writing to track N-1. In one embodiment, the read track trajectory for data track N may be updated based on the average of the PES of writing to data track N+1 and the PES of writing to data track N-1. At block 60, data is read from data track N using the updated read track trajectory for track N.

FIG. 4B shows an example of writing to data track N, then to data track N+1, then to data track N-1 including the circuitous edges 62A and 62B of the written data track when writing to data track N-1 and the resulting adjacent track interference imposed on data track N. In order to compensate for the adjacent track interference from data track N+1 and N-1, the read track trajectory for data track N is updated based on the PES of writing to data track N+1 and the PES of writing to data track N-1. In one embodiment, the read trajectory for data track N is updated by adding to the ideal track centerline the average of the PES of writing to data track N+1 and the PES of writing to data track N-1. In this embodiment, the updated read track trajectory for data track N follows a trajectory that is substantially centered between edge 52A of written data track N+1 and edge 62B of written data track N-1 as shown in FIG. 4B.

Figure 5:
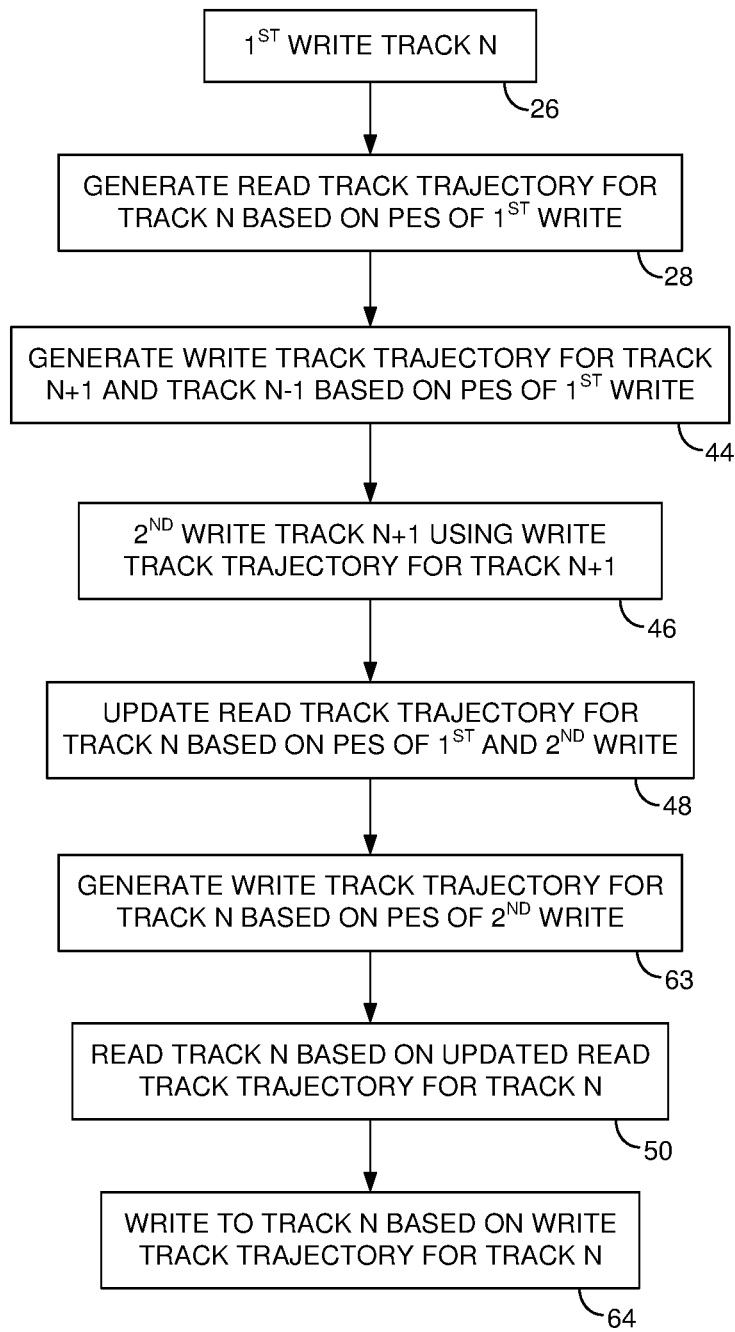
FIG. 5 is a flow diagram according to an embodiment wherein when writing to data track N+1 a write track trajectory for data track N is generated based on the PES of the write to data track N+1.

FIG. 5 is a flow diagram according to an embodiment which extends on the flow diagram of FIG. 3A, wherein in connection with writing to data track N+1 at block 46, a write track trajectory is generated for data track N at block 63 based on the PES of writing to data track N+1. In one embodiment, the write track trajectory is generated for data track N by adding to the ideal track centerline the half of the PES values when writing to data track N+1. In this manner when writing again to data track N at block 64 using the write track trajectory for data track N, the resulting adjacent track interference imposed on written data track N+1 is reduced (i.e., the squeeze of data track N+1 is reduced).

Figure 6:
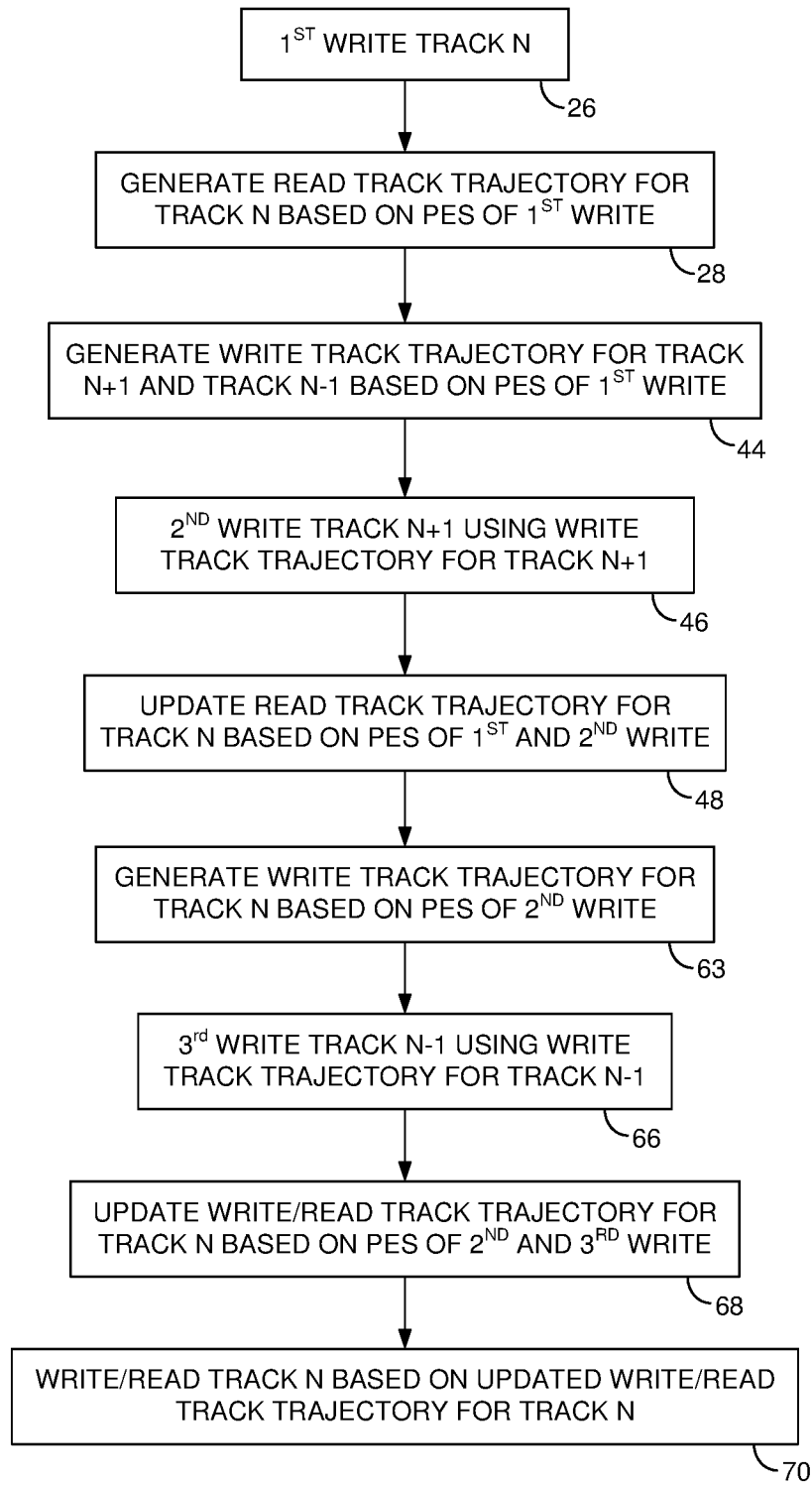
FIG. 6 is a flow diagram according to an embodiment wherein when writing to data track N, then to data track N+1, then to data track N−1, the write/read track trajectory for data track N is updated to compensate for the adjacent track interference.

FIG. 6 is a flow diagram according to an embodiment which extends on the flow diagram of FIG. 5, wherein in connection with writing to data track N-1 at block 66 the write/read track trajectory of data track N is updated based on the average of the PES of writing to data track N+1 and the PES of writing to data track N-1 (block 68). Data track N is then accessed (write/read) using the updated write/read track trajectory (block 70). In this embodiment, the read track trajectory for data track N is the same as the write track trajectory in order to reduce the adjacent track interference when reading data track N as well as reducing the adjacent track interference imposed on the adjacent data tracks N+1 or N-1 when writing data track N.

Figure 7:
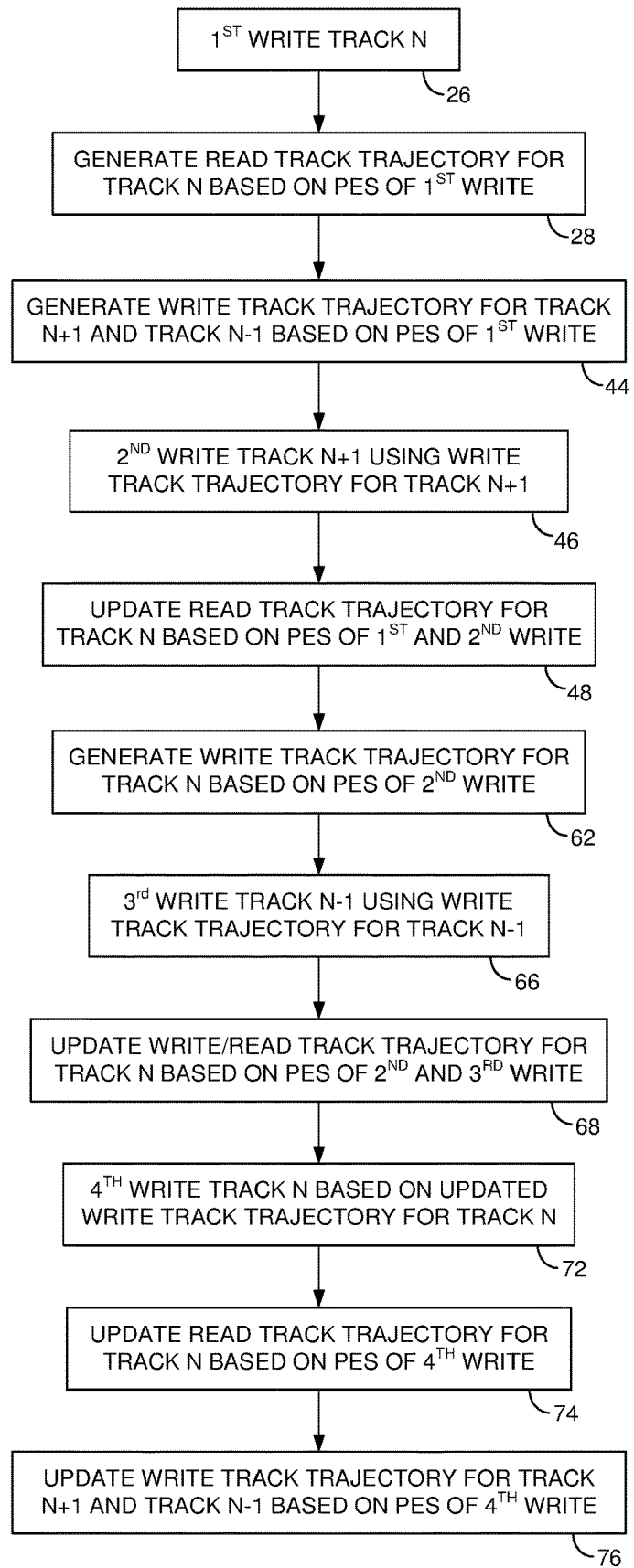
FIG. 7 is a flow diagram according to an embodiment wherein when writing to data track N, then to data track N+1, then to data track N−1, then again to data track N, the read track trajectory for data track N and the write track trajectory for data track N+1 and N−1 are updated based on the PES of the write to data track N.

FIG. 7 is a flow diagram according to an embodiment which extends on the flow diagram of FIG. 6, wherein in connection with writing again to data track N at block 72 using the update write track trajectory for data track N, the read track trajectory for data track N is updated based on the PES of writing to data track N similar to block 28 of FIG. 2B. That is in one embodiment, at block 74 the read track trajectory for data track N is generated by adding to the write track trajectory half the PES value generated at each servo sector when writing to data track N. The write track trajectory for data track N remains the same, and so after rewriting data track N the updated read track trajectory becomes different from the write track trajectory for data track N. At block 76 the write track trajectory for data track N+1 and data track N−1 are updated based on the PES of writing to data track N as well as the PES of writing to the data tracks adjacent to data tracks N+1 and N−1 as described above.

Figure 8A:
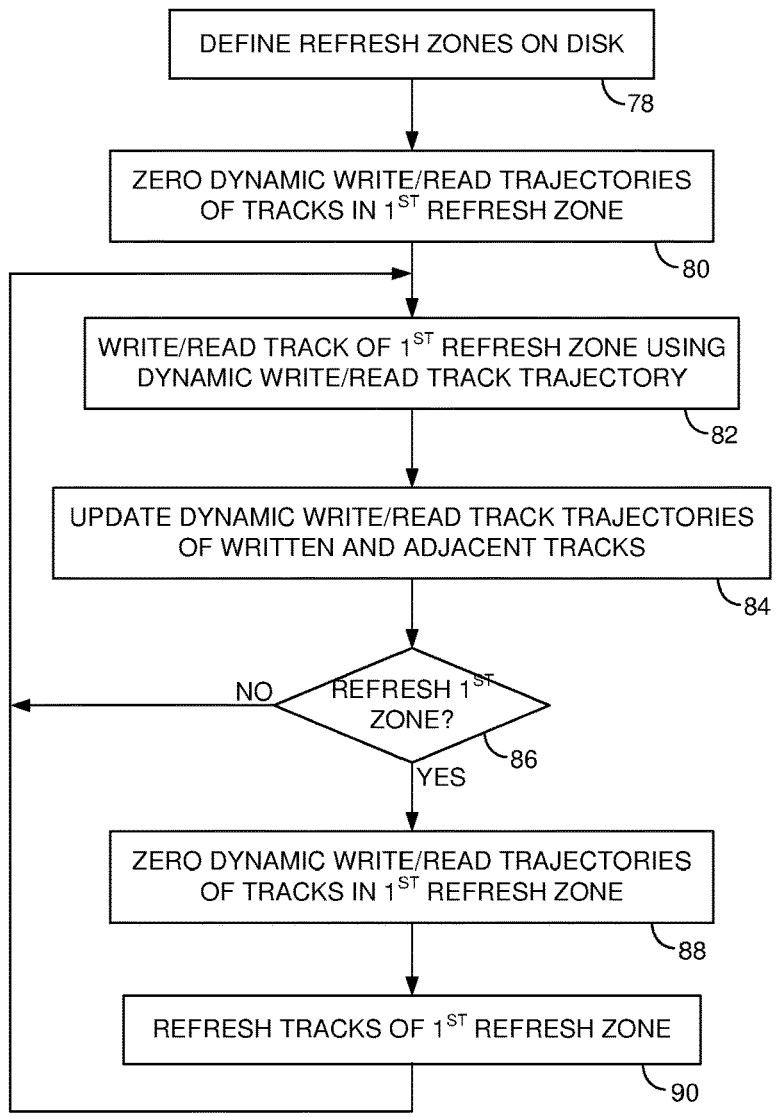
FIG. 8A is a flow diagram according to an embodiment wherein when refreshing a refresh zone of data tracks, the dynamic track trajectories for the data tracks are zeroed.
Figure 8B:
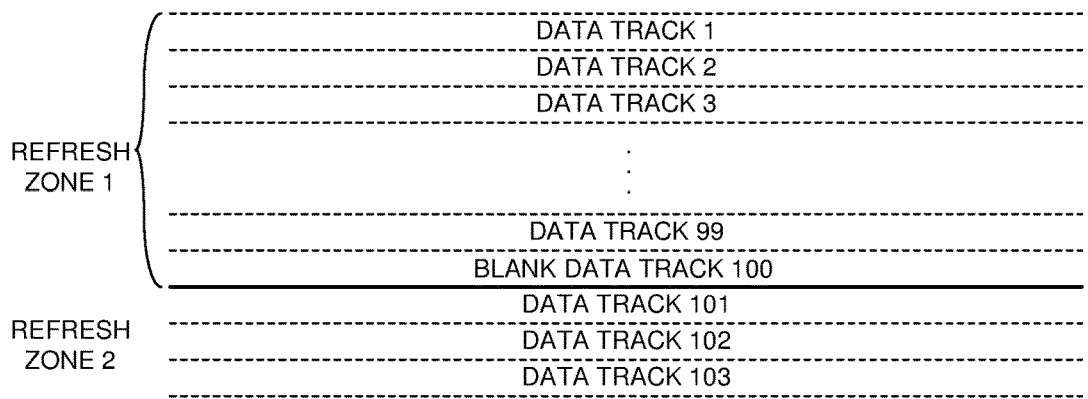
FIG. 8B shows an embodiment wherein each refresh zone comprises at least one blank data track at the end of the refresh zone to facilitate the refresh of each refresh zone.

FIG. 8A is a flow diagram according to an embodiment wherein a plurality of refresh zones are defined on the disk (block 78), with each refresh zone comprising a band of consecutive data tracks as shown in FIG. 8B. Before writing data to a first refresh zone, the dynamic track trajectories (write/read) for the data tracks of the zone are zeroed (block 80). Data is then written/read to/from the data tracks of the first refresh zone using the corresponding dynamic track trajectories (block 82) and the dynamic track trajectories are updated (block 84) as described above. This process is repeated until the first refresh zone is identified as needing to be refreshed before one or more of the data tracks becomes unrecoverable (block 86). A refresh zone may be identified as needing to be refreshed in any suitable manner, for example, when a number of write operations to the refresh zone exceeds a threshold, when the average signal quality during read operations falls below a threshold, when an error rate or other quality metric exceeds a threshold during read operations, etc. When executing the refresh operation of the first refresh zone, the dynamic track trajectories are again zeroed (block 88), and the data in the refresh zone is refreshed by executing read/write operations (block 90) while updating the dynamic track trajectories.

Referring to the example of FIG. 8B, during a refresh operation of the first refresh zone the data may be read from a number of consecutive data tracks starting with the first data track. The first data track may then be rewritten using the zeroed write track trajectory and the write trajectory for the second data track updated using the PES of the write operation as described above. The second data track may then be rewritten using the updated write track trajectory for the second data track, and the write trajectory for the third data track updated using the PES of the write operation. After rewriting each data track, data from another of the consecutive data tracks may be read (i.e., reading a sliding window of data tracks). In this manner, the adjacent track interference resulting from a refresh write operation has no effect since the data from the adjacent data track has already been recovered prior to the write operation. In one embodiment, the refresh of the first refresh zone continues by rewriting the consecutive data tracks until reaching the second to last data track in the refresh zone. As shown in FIG. 8B, in one embodiment the last data track of a refresh zone is left blank to facilitate the end of the refresh operation (i.e., the blank data track enables the first data track of the following refresh zone to be refreshed using a zeroed write track trajectory). Leaving the last data track of each refresh zone blank may also avoid an excessively squeezed last data track due to the propagation effect on the dynamic track trajectories when writing the data tracks in a consecutive order. In another embodiment, a refresh operation may relocate the data from a first refresh zone to a second (blank) refresh zone. Although a refresh zone in the example of FIG. 8B consists of 100 data tracks, in other embodiments each refresh zone may comprise any suitable number of data tracks, including an embodiment wherein the number of data tracks per refresh zone may vary across the refresh zones.

Figure 9:
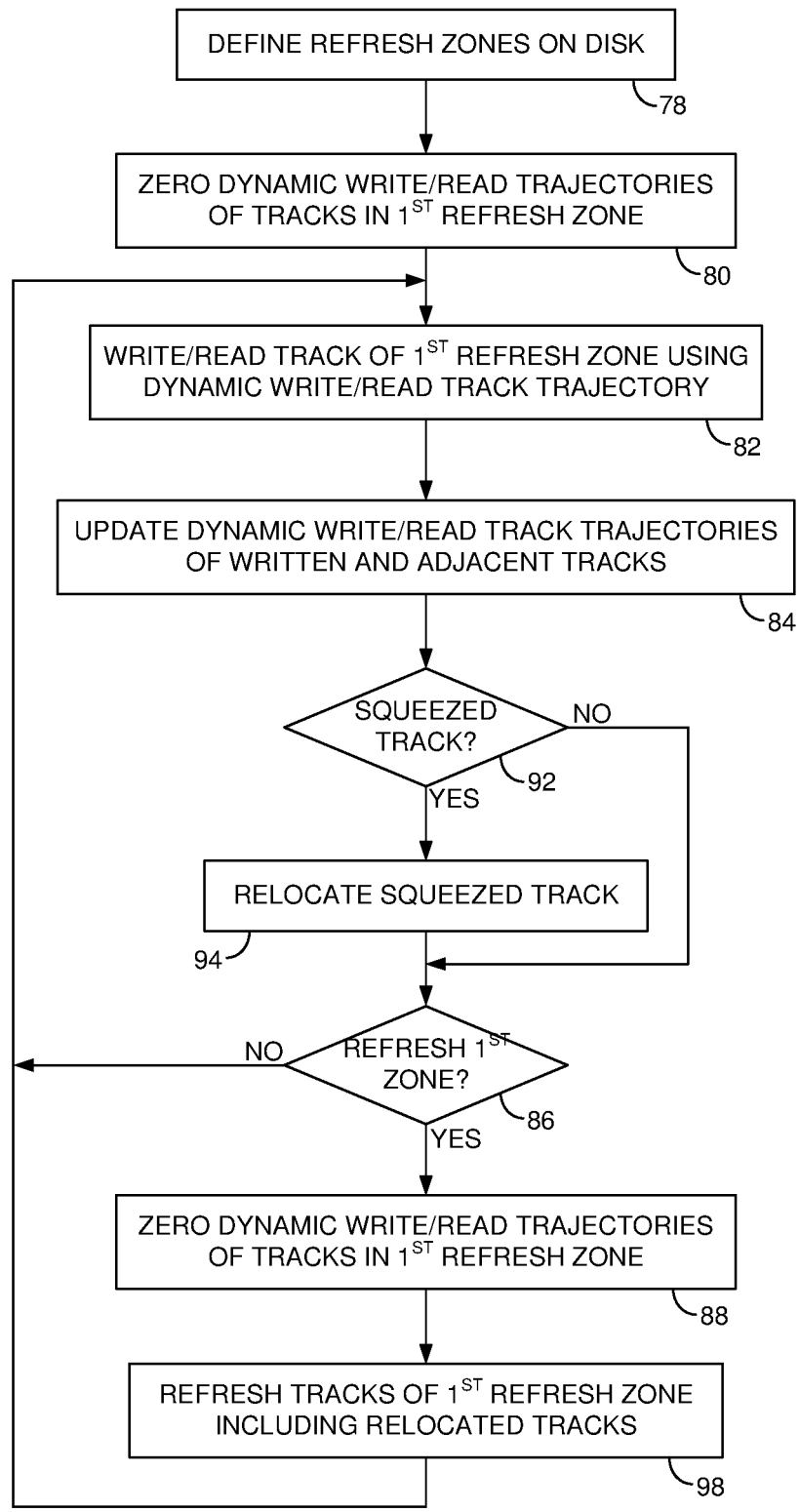
FIG. 9 is a flow diagram according to an embodiment wherein when a data track of a refresh zone becomes overly squeezed, the data track is relocated (e.g., to a non-volatile semiconductor memory or to a different refresh zone).

FIG. 9 is a flow diagram according to an embodiment which extends on the flow diagram of FIG. 8A, wherein prior to refreshing the first refresh zone an excessive squeeze condition may be detected for a data track in the first refresh zone (block 92). Rather than refresh the squeezed data track (which may cause a domino effect), or refresh the entire refresh zone, in one embodiment the squeezed data track is relocated (block 94), for example to a non-volatile memory, such as to a different area on the disk or to a non-volatile semiconductor memory (NVSM) 96 as shown in FIG. 2A. The write track trajectory for the data tracks adjacent the relocated data track are also updated to take advantage of the additional spacing provided by the "blank" relocated data track. During the fresh of the first refresh zone (block 98), the data from the relocated data tracks is rewritten to a data track of the first refresh zone (thereby freeing space in the non-volatile memory to store relocated data tracks from other refresh zones).

Figure 10A:
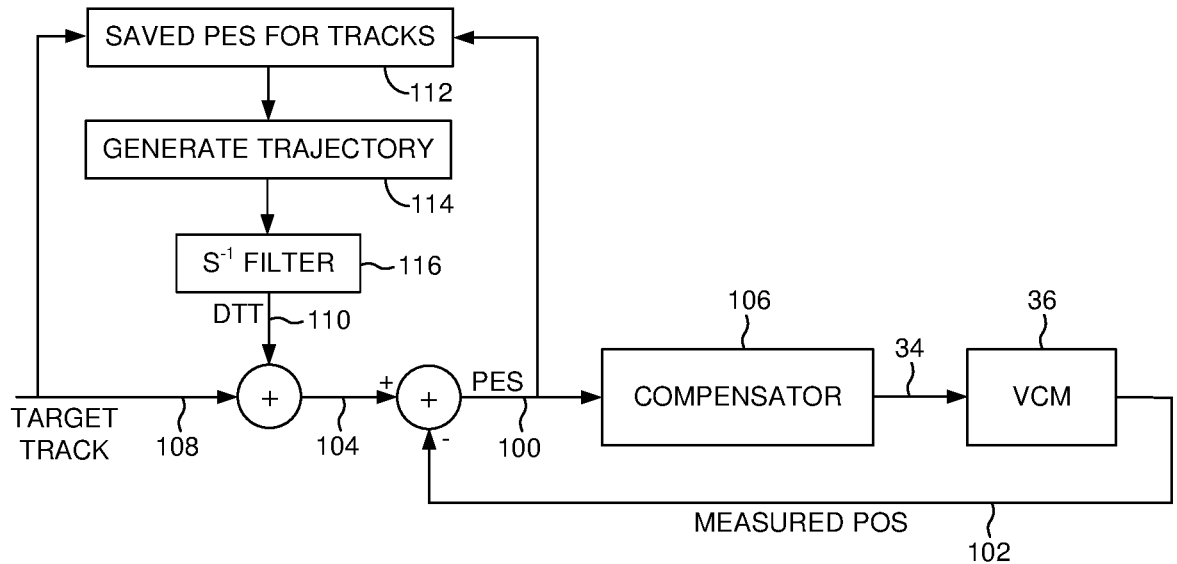
FIG. 10A shows a servo control system according to an embodiment wherein the PES when writing to the data tracks is saved and used to generate a dynamic track trajectory using a sensitivity function of the servo control system.
Figure 10B:
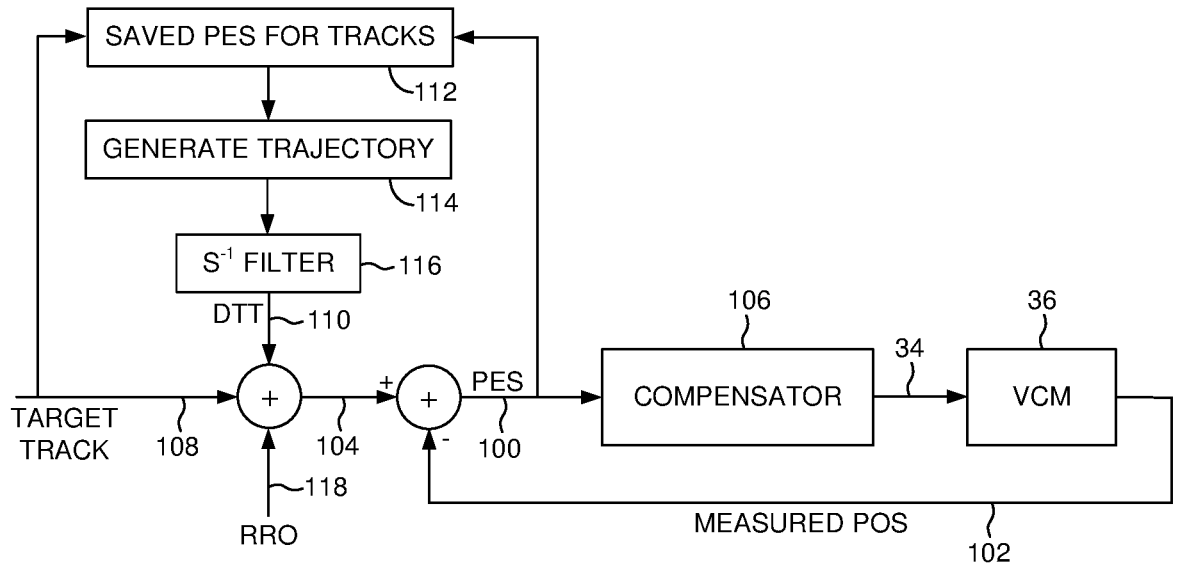
FIG. 10B shows an embodiment wherein the track trajectories are modified using repeatable runout (RRO) compensation values in addition to the dynamic track trajectory values.

FIG. 10A shows a servo control system for controlling the head while accessing a data track according to an embodiment wherein the PES 100 is generated by subtracting a measured position 102 of the head (based on the servo sectors) from a reference position 104. The PES 100 is filtered using a suitable compensator 106 to generate a control signal 34 applied to the VCM 36. In one embodiment, the reference position 104 is generated by adjusting an ideal data track centerline 108 of a target data track with the values of the dynamic track trajectory 110 generated for the target data track. In this embodiment, the PES values generated during each write operation are saved in a non-volatile memory 112, such as on the disk or in the NVSM 96 of FIG. 2A. A write or read track trajectory is generated at block 114 as described above for the target data track, and the resulting values of the track trajectory are filtered at block 116 with the inverse of the sensitivity function ($S^{-1}$) of the servo control system to generate the values of the dynamic track trajectory 110. In an embodiment shown in FIG. 10B, the ideal centerline of the target data track may also be adjusted using repeatable runout (RRO) values 118 that compensate for a written-in repeatable runout of the servo sectors. The RRO values 118 may be generated using any suitable technique as is known in the art.

In the embodiments described above, writing to a data track may involve writing to the entire data track or to a partial data track. When writing to a partial data track, the PES generated for the partial track write are saved (e.g., replace the corresponding PES in the non-volatile memory 112 of FIG. 10A). In one embodiment, the data tracks may be written in a random order referred to as conventional magnetic recording (CMR), and in another embodiment the data tracks may be written in a consecutive order, such as with shingled magnetic recording (SMR).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising servo data for defining a plurality of data tracks, including consecutive data tracks N−1, N, and N+1;
   a head actuated over the disk; and
   control circuitry configured to:
   first write to data track N using a first position error signal (PES) generated by reading the servo data, wherein the first PES is generated relative to a write track trajectory for data track N;
   generate a read track trajectory for data track N based on the first PES of the first write, wherein the read track trajectory is different than the write track trajectory; and
   read from data track N based on the read track trajectory for data track N.

2. The data storage device as recited in claim 1, wherein the control circuitry is further configured to generate a write track trajectory for data track N−1 and data track N+1 based on the first PES of the first write.

3. The data storage device as recited in claim 1, wherein the control circuitry is further configured to:
   second write to data track N+1 using a second PES generated by reading the servo data;
   update the read track trajectory for data track N based on the first PES of the first write and the second PES of the second write; and
   read from data track N based on the updated read track trajectory for data track N.

4. The data storage device as recited in claim 3, wherein the control circuitry is further configured to update the read track trajectory for data track N based on an average of the first PES of the first write and the second PES of the second write.

5. The data storage device as recited in claim 3, wherein the control circuitry is further configured to:
   generate a write track trajectory for data track N based on the second PES of the second write; and
   write to data track N based on the write track trajectory for data track N.

6. The data storage device as recited in claim 3, wherein the control circuitry is further configured to:
   third write to data track N−1 using a third PES generated by reading the servo data;
   update the read track trajectory for data track N based on the second PES of the second write and the third PES of the third write; and
   read from data track N based on the updated read track trajectory for data track N.

7. The data storage device as recited in claim 6, wherein the control circuitry is further configured to update the read track trajectory for data track N based on an average of the second PES of the second write and the third PES of the third write.

8. The data storage device as recited in claim 5, wherein the control circuitry is further configured to:
   third write to data track N−1 using a third PES generated by reading the servo data;
   update the write track trajectory for data track N based on the second PES of the second write and the third PES of the third write; and
   write to data track N based on the updated write track trajectory for data track N.

9. The data storage device as recited in claim 8, wherein the control circuitry is further configured to update the read track trajectory for data track N based on the second PES of the second write and the third PES of the third write such that the read track trajectory for data track N is the same as the write track trajectory for data track N.

10. The data storage device as recited in claim 9, wherein the control circuitry is further configured to update the write track trajectory for data track N based on an average of the second PES of the second write and the third PES of the third write.

11. The data storage device as recited in claim 9, wherein the control circuitry is further configured to:
   fourth write to data track N using a fourth PES generated by reading the servo data; and
   update the read track trajectory for data track N based on the fourth PES of the fourth write such that the read track trajectory for data track N is different from the write track trajectory for data track N.

12. The data storage device as recited in 11, wherein the control circuitry is further configured to update the write track trajectory for data track N−1 and data track N+1 based on the fourth PES of the fourth write.

13. A data storage device comprising:
   a disk comprising servo data for defining a plurality of data tracks, including consecutive data tracks N−1, N, and N+1;
   a head actuated over the disk; and
   control circuitry configured to:
      define a plurality of refresh zones on the disk, including a first refresh zone comprising data tracks N−1, N, and N+1;
      update a dynamic track trajectory for data track N based on writing data track N−1 or data track N+1;
      access data track N based on the dynamic track trajectory for data track N;
      refresh the first refresh zone; and
      zero the dynamic track trajectory for data track N in connection with refreshing the first refresh zone.

14. The data storage device as recited in claim 13, wherein the dynamic track trajectory for data track N comprises a dynamic write track trajectory for data track N and a dynamic read track trajectory for data track N.

15. The data storage device as recited in claim 14, wherein when refreshing the first refresh zone the control circuitry is further configured to:
   first write to data track N−1 using a first position error signal (PES) generated by reading the servo data; and
   update the zeroed dynamic write track trajectory for data track N based on the first PES of the first write.

16. The data storage device as recited in claim 15, wherein when refreshing the first refresh zone the control circuitry is further configured to:
   second write to data track N using a second PES generated by reading the servo data; and
   update the zeroed dynamic read track trajectory for data track N based on the first PES of the first write and the second PES of the second write.

17. The data storage device as recited in claim 16, wherein when refreshing the first refresh zone the control circuitry is further configured to:
   third write to data track N+1 using a third PES generated by reading the servo data; and
   update the dynamic write track trajectory and the dynamic read track trajectory for data track N based on the second PES of the second write and the third PES of the third write.

18. The data storage device as recited in claim 13, wherein prior to refreshing the first refresh zone, the control circuitry is further configured to relocate data stored in data track N due to a squeeze of data track N.

19. The data storage device as recited in claim 18, wherein when refreshing the first refresh zone, the control circuitry is further configured to write the relocated data to the first refresh zone.

20. A data storage device comprising:
   a disk comprising servo data for defining a plurality of data tracks, including consecutive data tracks N−1, N, and N+1;
   a head actuated over the disk;
   a means for first writing to data track N using a first position error signal (PES) generated by reading the servo data, wherein the first PES is generated relative to a write track trajectory for data track N;
   a means for generating a read track trajectory for data track N based on the first PES of the first write, wherein the read track trajectory is different than the write track trajectory; and
   a means for reading from data track N based on the read track trajectory for data track N.

\* \* \* \* \*